United States Patent
Ziegler et al.

(10) Patent No.: US 6,711,038 B2
(45) Date of Patent: Mar. 23, 2004

(54) METHOD FOR CONTROLLING BI-DIRECTIONAL SWITCHES IN MATRIX CONVERTERS

(75) Inventors: Marcus Ziegler, Hünfeld (DE); Wilfried Hofmann, Dresden (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/161,326

(22) Filed: Jun. 3, 2002

(65) Prior Publication Data

US 2003/0002306 A1 Jan. 2, 2003

Related U.S. Application Data

(63) Continuation of application No. PCT/DE00/04285, filed on Dec. 1, 2000.

(30) Foreign Application Priority Data

Dec. 3, 1999 (DE) .......................................... 199 58 041

(51) Int. Cl.[7] ............................................... H02M 7/00

(52) U.S. Cl. ..................................................... 363/123

(58) Field of Search ................................. 363/159, 163, 363/127, 123; 361/93.9, 57, 18; 307/115

(56) References Cited

U.S. PATENT DOCUMENTS 6,166,930 A * 12/2000 Czerwinski .................. 363/44

FOREIGN PATENT DOCUMENTS

DE 197 46 797 A 5/1999

OTHER PUBLICATIONS

Cittadini et al.: "A Matrix Converter Switching Controller for Low Losses Operation Without Snubber Circuits" EPE Association, vol. Cong. 7, 1997, pp. 199–203 No month.
Nandor Burany: "Safe Control of Four–Quadrant Switches" in: Conference record of the Industry Applications Society Annual Meeting, USA, New York, vol. Conf. 24 Oct. 1, 1989, pp. 1190–1194.
Pan C–T et al: "A Zero Switching Loss Matrix Converter", IEEE PESC 1993 pp. 545–550 No month.
J.G. Cho et al.: "Soft–Switched Matrix Converter for High Frequency Direct Ac to AC Power Conversion" in: EPE, 1991 No month.
Svensson: "The Modulation and Control of a Matrix Converter Synchronous Machine Drive" in: EPE, 1991, No month.

* cited by examiner

*Primary Examiner*—Shawn Riley
(74) *Attorney, Agent, or Firm*—Henry M. Feiereisen

(57) ABSTRACT

In a method for controlling bi-directional switches in power converters, with separate control signals for both current directions, preferably 3×3 matrix converters, a switching process from a base main state, into a secondary main state, and vice versa, occurs after a voltage controlled two-step process or a voltage controlled four-step process, without additional operational current-conducting components. After a first step, all uni-directional switches, apart from those at the interface of reference main state and target main state, are switched off and after a second step, all target main state switches are switched on. The switching processes can thus be carried out, at any time, by an appropriate choice of interval beginning and interval end, whereby a freewheeling arm for both current directions permanently exists, the only requirement being the creation of a current interval for each phase in multi-phase systems. The method is applicable with practically all supply current frequencies.

7 Claims, 5 Drawing Sheets

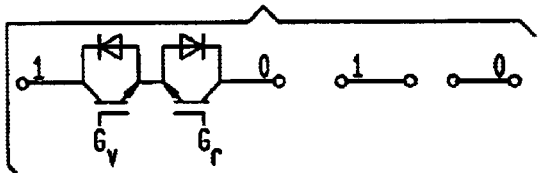
FIG. 4A
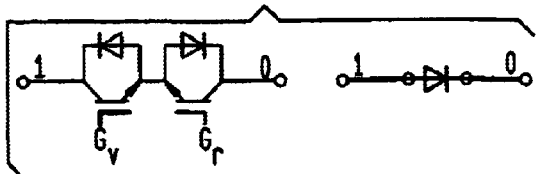
FIG. 4C
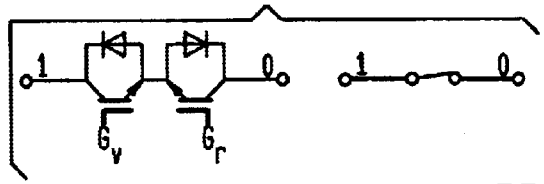
FIG. 4B
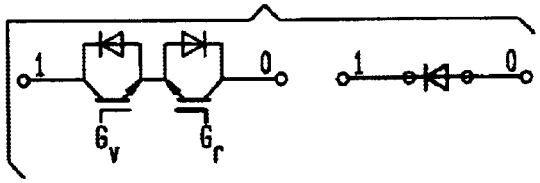
FIG. 4D
FIG. 5
| 1 | 2 | 3 | 4 | 5 | 6 | 7 | 8 | 9 | 10 |
|---|---|---|---|---|---|---|---|---|---|
| CATEGORY | BASIC INPUT VOLTAGE | INTERVAL | STATE | S11v | S11r | S21v | S21r | S31v | S31r |
| N | $V_{i2}$ | 1 (61, 12) | V1 | 1 | 1 | 1 | | | |
| | | | V12 | | 1 | 1 | | | |
| | | | V2 | | 1 | 1 | 1 | | 1 |
| | | | V23 | | 1 | | | | 1 |
| | | | V3 | | 1 | | | 1 | 1 |
| | $V_{i3}$ | 3 (23, 34) | V2 | | 1 | 1 | 1 | | |
| | | | V23 | | | | 1 | 1 | |
| | | | V3 | | 1 | | 1 | 1 | 1 |
| | | | V31 | | 1 | | | 1 | |
| | | | V1 | 1 | 1 | | | 1 | |
| | $V_{i1}$ | 5 (45, 56) | V3 | 1 | | | | 1 | 1 |
| | | | V31 | 1 | | | | | 1 |
| | | | V1 | 1 | 1 | | 1 | | 1 |
| | | | V12 | 1 | | | 1 | | |
| | | | V2 | 1 | | 1 | 1 | | |
| P | $V_{i1}$ | 2 (12, 23) | V3 | | 1 | | | 1 | 1 |
| | | | V31 | | 1 | | | 1 | |
| | | | V1 | 1 | | | 1 | | |
| | | | V12 | | 1 | 1 | | | |
| | | | V2 | | 1 | 1 | 1 | | |
| | $V_{i2}$ | 4 (34, 45) | V1 | | 1 | | | 1 | |
| | | | V12 | 1 | | | 1 | | |
| | | | V2 | 1 | | 1 | 1 | 1 | |
| | | | V23 | | | | 1 | 1 | |
| | | | V3 | | | | | 1 | 1 |
| | $V_{i3}$ | 6 (56, 61) | V2 | | | 1 | 1 | | 1 |
| | | | V23 | | | 1 | | | 1 |
| | | | V3 | 1 | | 1 | | 1 | 1 |
| | | | V31 | 1 | | | | | 1 |
| | | | V1 | 1 | 1 | | | | 1 |

FIG. 6

| 1 | 2 | 3 | 4 | 5 | 6 | 7 | 8 | 9 | 10 |
|---|---|---|---|---|---|---|---|---|---|
| CATEGORY | BASIC INPUT VOLTAGE | INTERVAL | STATE | S11v | S11r | S21v | S21r | S31v | S31r |
| N | $V_{i2}$ | $\overset{1}{(61, 12)}$ | V1 | 1 | 1 | 1 | | | |
| | | | V13_1 | | | 1 | 1 | | |
| | | | V13_2 | | | 1 | 1 | | 1 |
| | | | V13_3 | | | | 1 | | 1 |
| | | | V3 | | | | 1 | 1 | 1 |
| | $V_{i3}$ | $\overset{3}{(23, 34)}$ | V2 | | | 1 | 1 | 1 | |
| | | | V21_1 | | | | 1 | 1 | |
| | | | V21_2 | | | 1 | | 1 | 1 |
| | | | V21_3 | | | 1 | | 1 | |
| | | | V1 | 1 | 1 | | | 1 | |
| | $V_{i1}$ | $\overset{5}{(45, 56)}$ | V3 | 1 | | | | 1 | 1 |
| | | | V32_1 | 1 | | | | | 1 |
| | | | V32_2 | 1 | | | 1 | | 1 |
| | | | V32_3 | 1 | | | 1 | | |
| | | | V2 | 1 | | 1 | 1 | | |
| P | $V_{i1}$ | $\overset{2}{(12, 23)}$ | V3 | | 1 | | | 1 | 1 |
| | | | V32_1 | | 1 | | | 1 | |
| | | | V32_2 | | 1 | 1 | | 1 | |
| | | | V32_3 | | 1 | 1 | | | |
| | | | V2 | | 1 | 1 | 1 | | |
| | $V_{i2}$ | $\overset{4}{(34, 45)}$ | V1 | 1 | 1 | | 1 | | |
| | | | V13_1 | 1 | | | 1 | | |
| | | | V13_2 | 1 | | | 1 | 1 | |
| | | | V13_3 | | | | 1 | 1 | |
| | | | V3 | | | | 1 | 1 | 1 |
| | $V_{i3}$ | $\overset{6}{(56, 61)}$ | V2 | | | 1 | 1 | | 1 |
| | | | V23_1 | | | 1 | | | 1 |
| | | | V23_2 | 1 | | 1 | | | 1 |
| | | | V23_3 | 1 | | | | | 1 |
| | | | V1 | 1 | 1 | | | | 1 |

# METHOD FOR CONTROLLING BI-DIRECTIONAL SWITCHES IN MATRIX CONVERTERS

CROSS-REFERENCES TO RELATED APPLICATIONS

This application is a continuation of prior filed copending PCT International application no. PCT/DE00/04285, filed Dec. 1, 2000.

This application claims the priority of German Patent Application Serial No. 199 58 041.3, filed Dec. 3, 1999, pursuant to 35 U.S.C. 119(a)–(d), the subject matter of which is incorporated herein by reference.

BACKGROUND OF THE INVENTION

The present invention relates to a method for controlling bi-directional switches in converters, in particular 3×3 matrix converters, using separate control signals for the two current directions.

Various methods for current commutation in matrix converters extend the basic topology by incorporating additional components which carry a load current during operation. For example, C. T. Pan ("*A zero switching loss matrix con verter*", 1993, IEEE PESC, p.545–550) and J. G. Cho ("*Soft switched Matrix converter for high frequency direct AC to AC power conversion*", 1991, EPE, p.196–201) propose the use of resonant circuits operating at higher frequencies; W. Söhner ("*The self-commutated direct converter and its use as a matrix converter for supplying asynchronous machine drives whose rotation speed is regulated*". Dissertation, University Karlsruhe, 1993) suggests freewheeling paths, while T. Svensson ("*The modulation and control of a Matrix Converter—Synchronous Machine Drive*", 1991. EPE p. 469–476) suggests the use of capacitors connected in parallel.

Systems incorporating higher-frequency resonant circuits disadvantageously have additional components which carry a load current during operation, so that accurate switching at the time of the zero crossing of the high-frequency current or voltage is required. It is not possible to select arbitrary switching times, which can cause dead times. Only a limited amount of damping of the oscillations in the input filters which are typical of matrix converters is possible. The solutions proposed by Söhner and Svensson disadvantageously also include additional components which carry current during operation, such as B6 bridges, an intermediate circuit capacitance with devices for voltage limiting, for example retarding choppers, or capacitors connected in parallel with the switches, as well as the additional associated losses.

However, four methods are known which do not require additional components to carry the load current during operation and use separate control signals for the two current directions (bi-directional switches, also known as four-quadrant switches, comprising a back-to-back parallel circuit formed by two two-quadrant switches, also referred to as unidirectional switches): two four-step methods that measure the commutation voltage and/or of the load current direction before each switching step (N. Burany "*Safe control of 4 Quadrant Switches*", 1989. IEEE-industry Application Society, p. 1190–1194), a method which allows commutation between only two input phases in two steps (R. Cittadini et al.: "*A matrix converter switching controller for low losses operation without snubber circuits*", 1997. EPE p.4.199–4.203) and a method which operates using two steps (M. Ziegler et al.: "*Methods for controlling bidirectional switches in converters*", 1997, German Patent Application 19746797.0-32).

The latter methods employ a switching algorithm in two or four steps. The switching sequence starts either by determining the polarity of the commutation voltage between the two phases involved in the switching process, or by determining the polarity of the current in the switch which is switched on at that time. Safety times, which are governed essentially by the switching times of the power semiconductors and their drive devices, must be observed between the steps.

The major disadvantage of the last-mentioned four methods is the necessity to precisely detect the current direction or the commutation voltage. This is particularly difficult when the values are small. In the case of a current measurement, this relates to the current zero crossing, and in the case of a voltage measurement, it relates to the zero crossing of the concatenated voltages. An incorrect measurement, for example as a result of offset errors due to residual magnetism in the measurement transformer, interference or fluctuations/oscillations in the input phase voltages, cause a brief short-circuit between two line phases or to an interruption in the output current. Both can destroy switch elements in the converter, particularly when using the method that detects the current direction. The trend to components with a low threshold voltage, such as Cool MOS for avoiding high forward losses, can lead to high short-circuit currents, even with low commutation voltages.

With the two four-step methods proposed by Burany, two unidirectional switches are switched off and two unidirectional switches are switched on. Furthermore, Burany's methods disadvantageously require four switching steps, which makes these methods less suitable for the rapid switching processes which are desirable for matrix converters. Matrix converters demand rapid switching, particularly for active damping of line filter oscillations and owing to the lack of any energy store.

A further disadvantage is that, once the current direction/commutation voltage has/have been detected, the subsequent switching steps are executed automatically before the first switching step, without the possibility to react to a change in the polarity of the current direction/commutation voltage, which can briefly result in a short-circuit or an interruption in the current during the entire four-step switching process.

The method proposed by R. Cittadini et al. inherently causes brief short-circuits. Furthermore, only commutation between two input phases is considered.

It would therefore be desirable and advantageous to control bidirectional switches with separate control signals for the two current directions, preferably in 3×3 matrix converters, with a minimum number of unidirectional switches that need to be switched in each commutation process, in such a way that:

no interruption can occur in the load/output currents, even when the current is very small, no short-circuit can occur, even when the concatenated input voltages are in the vicinity of a zero crossing, commutation is possible in as few switching steps as possible, without any additional components which carry load current during operation, the switching times can be defined within wide limits, the load current can be commutated for all input phases, a freewheeling path is provided for both current directions, at all times, even during switching.

SUMMARY OF THE INVENTION

According to one aspect of the invention, a method is provided for controlling bidirectional switches in converters, preferably 3×3 matrix converters, without the use of additional components that carry a load current during operation, wherein each bi-directional switch is composed of two back-to-back connected unidirectional switches that receive separate control signals for forward and reverse current directions. The method includes switching between a first main state and a second main state by a voltage-controlled two-step process which includes in a first step, switching off all unidirectional switches except for a subset of the unidirectional switches that include the first main state and the second main state, and in a second step, switching on all unidirectional switches for the second main state, wherein the first main state is a basic main state and the second main state is a secondary main state, or the first main state is a secondary main state and the first main state is a basic main state.

Advantageously, in the basic main state, unidirectional switches are redundantly closed in addition to the unidirectional switches that provide a bi-directional connection between a nominal input phase and a corresponding output phase, and in an associated secondary main state, one of the unidirectional switches is switched on between the corresponding output phase and the basic input phase. The latter unidirectional switch is in category N a unidirectional switch in a forward direction, and in category P a unidirectional switch in the reverse direction, resulting in additionally switched-on unidirectional switches in the basic main state, since in category N all unidirectional switches in the reverse current direction are already switched on, and in category P all unidirectional switches in the forward current direction are already switched on.

According to another advantageous embodiment, a synchronization signal can be associated with a time interval having an unchanged polarity in the basic input phase voltage. Alternatively or in addition, the synchronization signal can be associated with a time interval where the polarity of a concatenated voltage either remains the same or changes. During a transition from the first main state in a first time interval to the second main state in a following time interval, the second main state can be selected so as to include a bi-directional connection between the input phase and an associated output phase that is identical to the bi-directional connection in the first main state. Moreover, during a transition from a first time interval to a following time interval, in the first step all unidirectional switches except those providing a bi-directional connection between an input phase and an associated output phase can be switched off, and in the second step, redundant switches for the second state can be switched on.

The control method according to the invention provides the following advantages:

1. If the start and end of the interval are chosen appropriately, the method tolerates large deviations in the detection of the commutation voltage.
2. If the start and end of the interval are chosen appropriately, the method also operates in the region of the current zero crossing, i.e., in a region where currents are small.
3. if the start and end of the interval are chosen appropriately, one line phase may have a voltage drop, or a short-circuit, without affecting the commutation process.
4. There is no need for any additional components which carry load current during operation.
5. Switching between the basic main state and the two other secondary main states takes place in only two steps, with two unidirectional switches being switched off and on in one switching step, and only one unidirectional switch being switched on and off in the other step.
6. Switching processes can take place at an arbitrary time, even at high repetition frequencies, which virtually eliminates dead times and advantageously improves the dynamic response of the control process.
7. A freewheeling path exists for both current directions at any given time, i.e., even during switching.
8. With the control method according to the invention, only the maximum or minimum voltages of the input phase need be detected. For example, in a three-phase system, only the six cyclically recurring changes in the polarity of the phase voltages need be detected.
9. The proposed control method can be used with virtually any supply line frequency; only the switching times of the electronic components impose restrictions at relatively high frequencies.

BRIEF DESCRIPTION OF THE DRAWING

Other features and advantages of the present invention will be more readily apparent upon reading the following description of currently preferred exemplified embodiments of the invention with reference to the accompanying drawing, in which:

FIGS. 4a–4d shows an exemplary embodiment of a bidirectional switch with the following four states:
  4a.) bidirectional switch switched off,
  4b.) bidirectional switch switched on,
  4c.) unidirectional switch in the forward direction switched on,
  4d.) unidirectional switch in the reverse direction switched on;

FIG. 5 shows a table of all specific switching states for the converter element of FIG. 1 for commutation between the basic main state and the secondary main state in only two steps, with a "1" indicating a unidirectional switch that is switched on;

FIG. 6 shows a table of all specific switching states for the converter element of FIG. 1 for possible commutation in four steps between two secondary main states, with a "1" indicating a unidirectional switch that is switched on;

DETAILED DESCRIPTION OF PREFERRED EMBODIMENTS

The control method described herein is based on detecting a so-called basic input phase whose phase voltage ($V_{i1}$, $V_{i2}$, $V_{i3}$) within a specified interval is always greater than the other two input phase voltages (category P) or less than the other two input phase voltages (category N). The polarity of the concatenated voltage, or voltage difference, of the two other so-called secondary input phases may be either positive or negative, and may also change within the interval, even during commutation. This results in the subdivision into 60° intervals 1 . . . 6, as shown by way of example in FIG. 2 for a three-phase poly-phase system. An interval starts with the zero crossing of an input phase voltage, and ends with the next zero crossing of another input phase voltage. Within one interval, the association between the input phase with the basic input phase and secondary input phase must remain the same. The association of the input phases with the appropriate category (P and N) or with the basic input phase as a function of the interval is shown in columns 1–3 of FIG. 5. It is therefore evident, that the input phase with the voltage $V_{i2}$ always has the greatest voltage in the interval 4, and thus is the basic input phase voltage for category P, with the line phase $V_{i1}$ and the line phase $V_{i3}$ being secondary input phases, since the polarity of the concatenated voltage $V_{i3}-V_{i1}$ is not uniquely determined in the interval and may even change.

Figure 1:
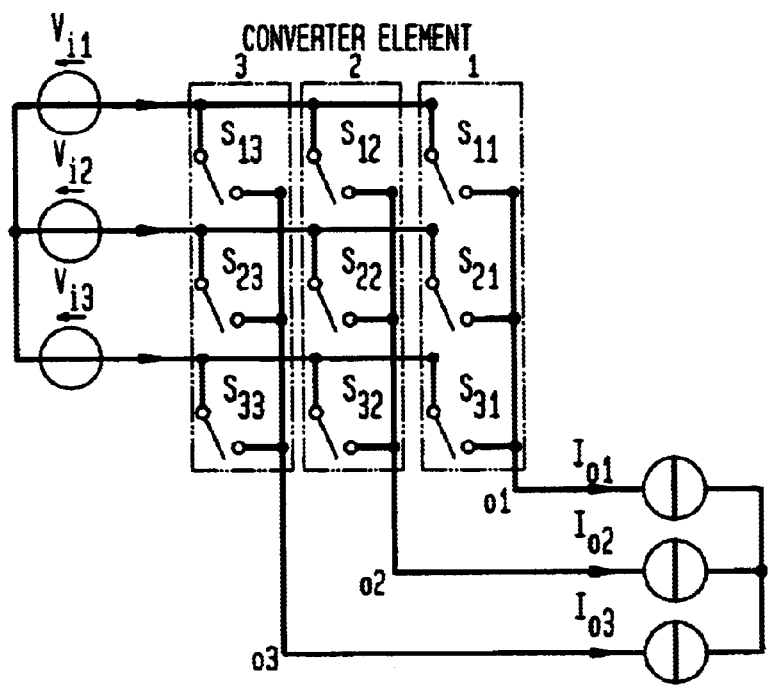
FIG. 1 shows an exemplary 3×3 matrix converter.

The commutation process based on the control method according to the invention will be explained for an exemplary converter element of the ideal 3×3 matrix converter shown in FIG. 1. A converter element includes three bidirectional switches, which can connect each of the three input phases to one output phase. The three converter elements are hence identical. The unidirectional individual switches are identified based on the following convention:

| S Switch | |
|---|---|
| 1st index | Index for the input phase |
| 2nd index | Index for the output phase |
| 3rd index | Possible current direction in the unidirectional switch: "v" forward, "r" reverse |

A bidirectional switch may assume the four switching states illustrated in FIGS. 4a–4d. Gates shown in bold denote a switched-on IGBT; gates that are not in bold denote an IGBT which is switched off. In the following, current paths are also shown in bold.

A single basic input phase exists at any given time, i.e., in each interval. Three main states V1, V2 and V3 can be identified which do not cause any short-circuit between two input phases (see FIG. 5 and FIG. 6, column 4, lines indicated in bold). Each main state produces a bidirectional connection between an output phase (for example o1) and the nominal input phase, state V1 with the input phase voltage $V_{i1}$, state V2 with the input phase voltage $V_{i2}$, and V3 with the input phase voltage $V_{i3}$. With regard to the main states, a distinction is drawn between the basic main state, which produces the bidirectional connection with the basic input phase, and the two secondary main states. In addition, so-called redundant unidirectional switches are closed in the main states. In the secondary main states, one of the unidirectional switches between the load and the basic input phase is also switched on, which is in the category N the unidirectional switch in the forward direction, and in the category P the unidirectional switch in the reverse direction. In the basic main state, two additional unidirectional switches are closed since, in the basic main state for category N, all the unidirectional switches in the reverse direction are switched on, and in category P, all the unidirectional switches in the forward direction are switched on. Accordingly, four unidirectional switches are switched on in the basic main state and three unidirectional switches are switched on in the secondary main state.

Assuming that there are n input phases, n+1 unidirectional switches are therefore closed in one converter element in a basic main state, i.e., in the basic main states in one converter element of the 3×3 matrix converter, four unidirectional switches are always closed and two are open. In the secondary main states, on the other hand, three unidirectional switches are closed, namely the bidirectional connection for the nominal input phase and, depending on whether the category is N or P, the unidirectional switch in the forward direction, or in the reverse direction, with respect to the basic input phase voltage.

Only two steps are required for the commutation between a basic main state and a secondary main state, i.e., for the commutation of the output current between a basic input phase and a secondary input phase:

1. Switching off the unidirectional switch(es), which is (are) not required for the target main state,
2. Switching on the unidirectional switch(es), which is (are) required for the target main state.

Figure 7:
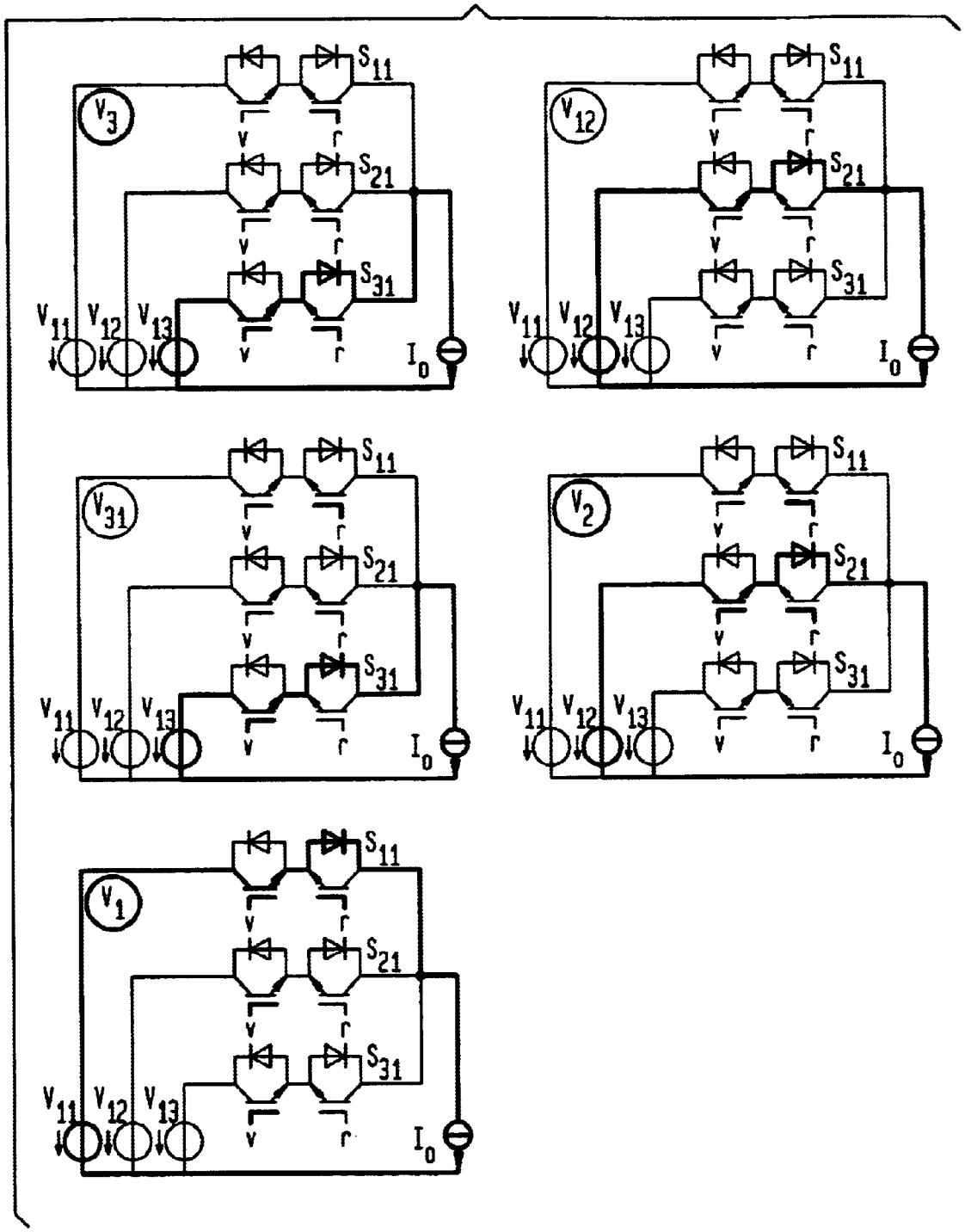
FIG. 7 shows a commutation example for the interval 2, $I_0>0$, $V_{i1}>V_{i2}$, $V_{i1}>V_{i3}$.
Figure 8:
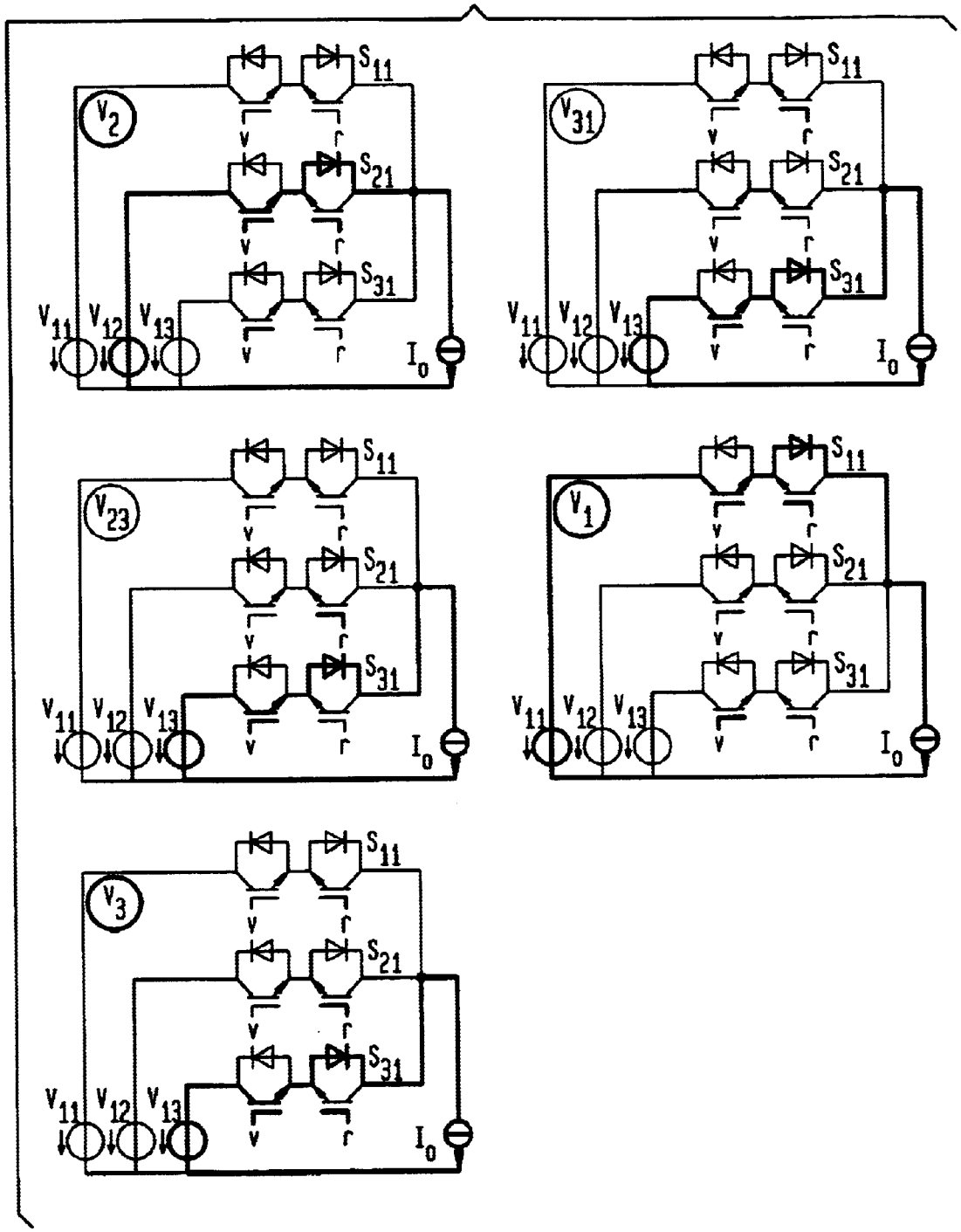
FIG. 8 shows a commutation example for the interval 3, $I_0>0$, $V_{i3}<V_{i1}$, $V_{i3}<V_{i2}$.

For commutation between the basic main states and the secondary main states, two unidirectional switches must be switched off and on in one switching step, whereas only one unidirectional switch needs to be switched on and off in the other step (see, for example, FIG. 7 and FIG. 8).

Figure 2:
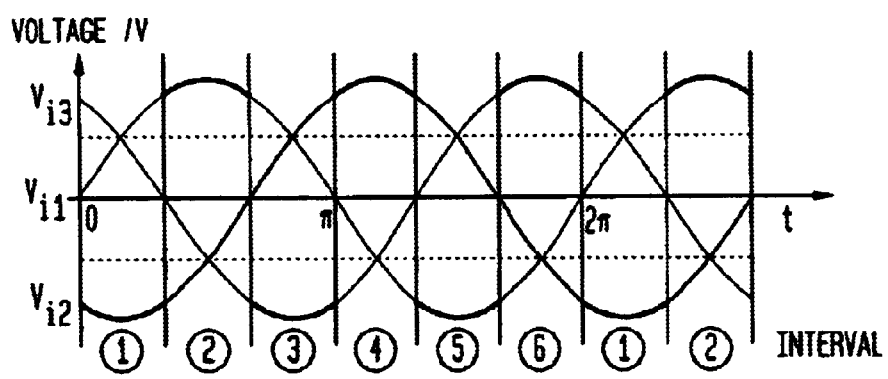
FIG. 2 shows an exemplary use of the method for a subdivision into 60° intervals in three-phase poly-phase systems.

FIG. 7 shows a commutation according to the process of the invention for the interval 2 of FIG. 2. This interval has three main states V3, V1 and V2, as well as two intermediate states V31 and V12. According to the configuration of the closed switches, the main state V1 is the basic main state and the main states V3 and V2 are each secondary main states. When commutating from the secondary main state V2 to the basic main state V1, the unidirectional switch $S_{31}$ is switched off. The resulting state is the intermediate states V31. In the second step, the switches $S_{11v}$ and $S_{21v}$ are switched on, thereby arriving at the basic main state V1. This commutation requires only two switching steps, in which one and two switches, respectively, are controlled.

The intermediate states (V12, V23, V31) are reached for the period of a safety time, which is governed essentially by the switching times of the active devices and their drive devices. Those unidirectional switches which are switched on in the intermediate state form the subset of the switched-on switches for the reference main state and for the target main state. In another example relating to interval 4, if switching takes place between the input voltages $V_{i2}$ and $V_{i3}$, corresponding to the states V2 and V3 (see also FIG. 5), then the two switches $S_{21r}$ and $S_{31v}$ remain switched on all the time and provide a current path for both current directions, while $S_{11V\ and\ S21V}$ are switched off in the first step, and $S_{31r}$ is switched on in the second step.

The commutation from one secondary main state to another secondary main state optionally takes place in four steps. Either as shown in FIG. 5, based on the sequence of the states in column 4, for example V1, V12, V2, V23, V3 and in the reverse order for interval 1; or as shown in FIG. 6 based on the sequence of the states in column 4, for example V1, V13_1, V13_2, V13_3, V3 and in the reverse order for interval 1.

Figure 3:
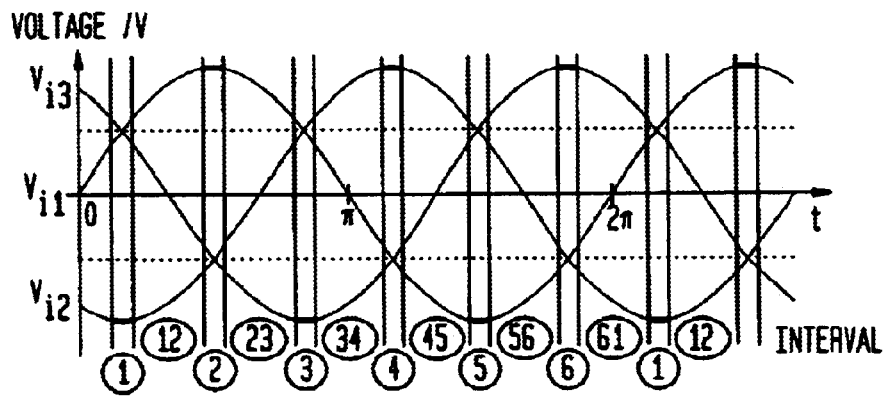
FIG. 3 shows an exemplary use of the method in the region of a zero crossing of the concatenated voltages.

FIG. 3 shows another example for subdividing the intervals, in order to be able to use the proposed method in the region of the zero crossing of the concatenated voltages. Either conventional commutation methods or the present commutation method can then optionally be used in the intermediate intervals (12, 23, 34, 45, 56, 61). If the present method is used, then, in the ideal case (where the polarity of the commutation voltages does not change within an interval), there are two options for selecting a basic input phase. For example, for an intermediate interval 23 in the category N, the input voltage $V_{i3}$ can be selected as the basic input phase, whereas the input voltage $V_{i1}$ can be selected in the category P. This results in the corresponding switching states depicted in FIGS. 5 and 6, with the intermediate intervals here being designated with brackets in column 3. The interval boundaries can be moved over a wide range, provided the basis of the control method according to the invention is satisfied.

The example shows the flexibility of the method, and hence the possibility for an extremely simple synchronization with the interval boundaries.

An important feature of the control method according to the invention becomes evident by forming the subset of all main states and/or intermediate states in one interval which, in category N, leads to the unidirectional switch of the basic input phase in the forward direction and, in category P, leads to the unidirectional switch of the basic input phase in the reverse direction. One unidirectional switch is thus always closed within one interval.

According to another feature, all states (main states as well as intermediate states) include one switched-on unidirectional switch in the forward direction and one switched-on unidirectional switch in the reverse direction. This prevents any gaps or interruptions in the load current in an interval.

The disclosed method according to the invention for controlling bidirectional switches in converters, in particular matrix converters, is independent of the number of steps in each commutation process (two-step method, four-step method).

While the invention has been illustrated and described as embodied in a method for controlling bi-directional switches in matrix converters, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for controlling bi-directional switches in converters, preferably 3×3 matrix converters, without the use of additional components that carry a load current during operation, each bi-directional switch composed of two back-to-back connected unidirectional switches that receive separate control signals for forward and reverse current directions, the method comprising switching between a basic main state and a secondary main state or vice versa by a voltage-controlled two-step process which includes:

in a first step, switching off all unidirectional switches except for a subset of the unidirectional switches that include a reference main state and a target main state, and in a second step, switching on all unidirectional switches for the target main state.

2. The method for controlling bi-directional switches in converters as claimed in claim 1, further comprising, in the basic main state, redundantly closing unidirectional switches in addition to those unidirectional switches that provide a bi-directional connection between a nominal input phase and a corresponding output phase, in the secondary main state associated with the basic main state, switching on one of the unidirectional switches between the corresponding output phase and the basic input phase, which in category N is a unidirectional switch in a forward direction, and in category P is a unidirectional switch in the reverse direction, resulting in additionally switched-on unidirectional switches in the basic main state, since in category N all unidirectional switches in the reverse current direction are already switched on, and in category P all unidirectional switches in the forward current direction are already switched on.

3. The method for controlling bi-directional switches in converters as claimed in claim 1, and further associating a synchronization signal with a time interval having an unchanged polarity in the basic input phase voltage.

4. The method for controlling bi-directional switches in converters as claimed in claim 1, and further associating a synchronization signal with a time interval where a concatenated voltage changes polarity.

5. The method for controlling bi-directional switches in converters as claimed in claim 1, wherein during a transition from a first time interval to a following time interval, the main state in the following time interval is selected so as to include a bi-directional connection between the input phase and an associated output phase that is identical to the bi-directional connection in the reference main state.

6. The method for controlling bi-directional switches in converters as claimed in claim 1, wherein during a transition from a first time interval to a following time interval, in the first step all unidirectional switches except those providing a bi-directional connection between an input phase and an associated output phase are switched off, and in the second step, redundant switches for the target main state are switched on.

7. The method for controlling bi-directional switches in converters as claimed in claim 1, and further associating a synchronization signal with a time interval where a polarity of a concatenated voltage remains unchanged.

* * * * *